May 8, 1962 B. H. ROWE 3,033,492
CRUISE LIFT-FAN SYSTEM
Filed April 20, 1961 2 Sheets-Sheet 1
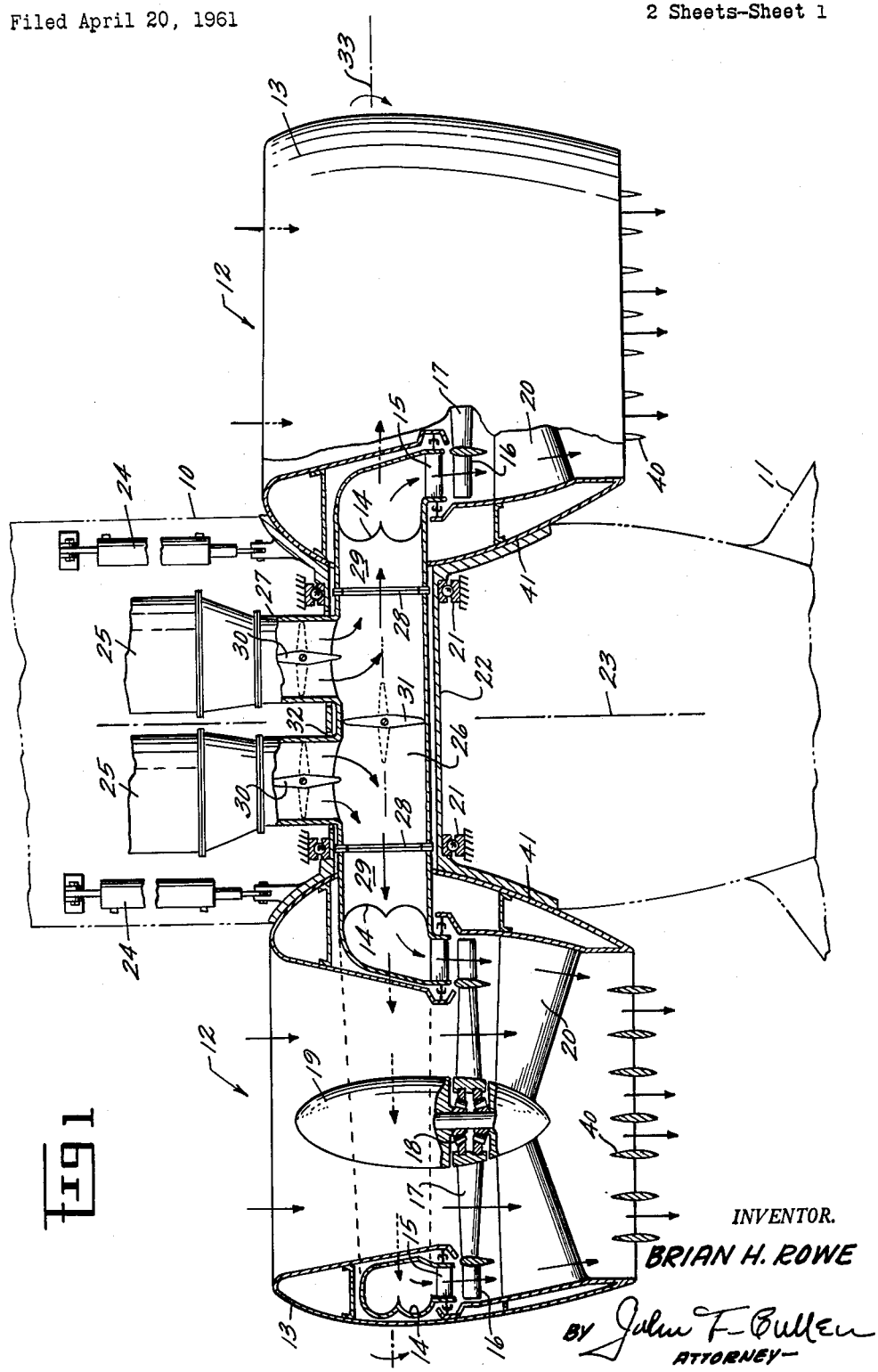
INVENTOR.
BRIAN H. ROWE
BY John F. Cullen
ATTORNEY

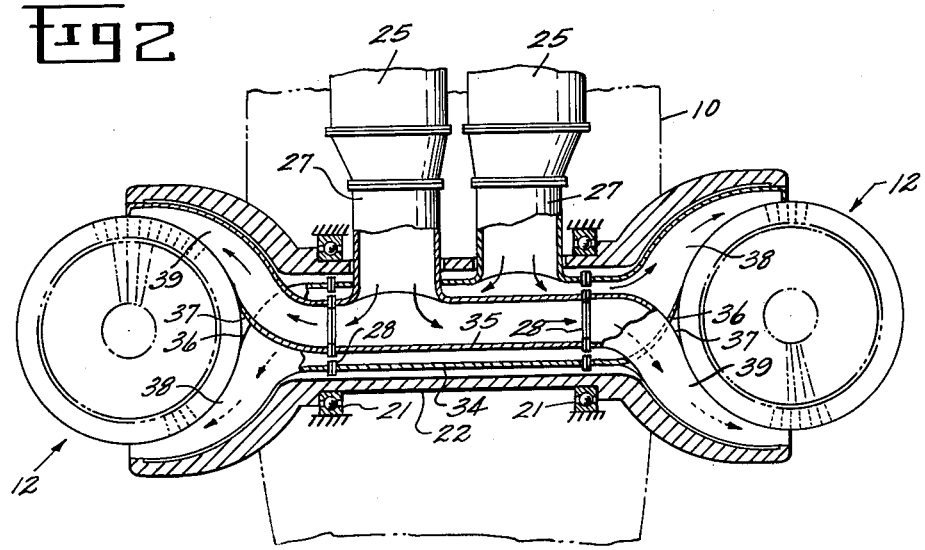
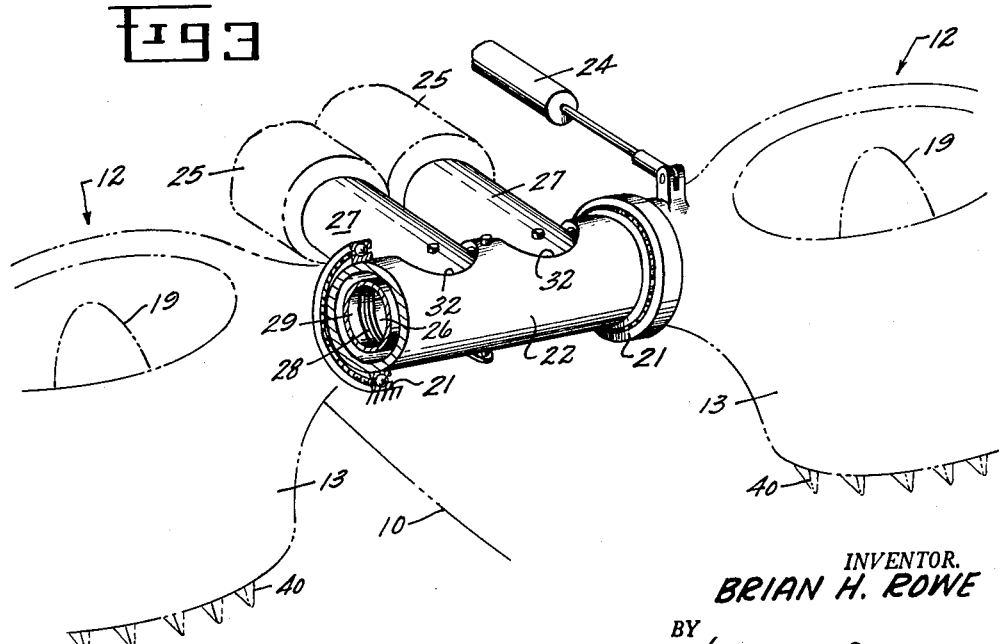

prominence is the use of lift-fans
3,033,492
CRUISE LIFT-FAN SYSTEM
Brian Henry Rowe, Cincinnati, Ohio, assignor to General Electric Company, a corporation of New York
Filed Apr. 20, 1961, Ser. No. 104,327
9 Claims. (Cl. 244—23)

The present invention relates to a cruise lift-fan system for VTO aircraft and, more particularly, to a system that is easily adaptable to many aircraft for efficient lift and economical cruise on the same powerplant.

In VTOL—vertical take-off and landing—aircraft a system that has come into prominence is the use of lift-fans mounted in the vehicle wings or fuselage. By movement of large quantities of low pressure air through the fans, vertical lift many be obtained. Then the vehicle, if an aircraft, may continue in a vertical direction until suitable altitude is obtained at which time conversion can be made to horizontal flight by suitable jet reaction. This has been done by additional jet engines in the normal fashion and by diverting the fan discharge by louvers or suitable diverter valves to provide a horizontal component. Additionally, aircraft have been designed which employ the use of tiltable powerplants that may be suitably mounted and which are rotated in the vertical direction for lift and then rotated through a transition zone to provide propulsion in the forward direction. Such systems have employed ducted propellers and conventional jet engines. Obviously, it is essential in an aircraft that balance be maintained at all times for suitable operation. The loss of a gas generator can be fatal in an aircraft. During horizontal movement the normal ailerons provide roll control in a well known manner. However, in VTOL vehicles during the hovering position there is no movement of air across the wings to provide this control and means are required to provide roll control or avoid any tendency to roll in the event of failure of a gas generator or fan. Similarly, pitch control is required in order to keep the vehicle on an even keel. One scheme is to transfer power from one fan into another in order to provide the roll control and a cross-coupling arrangement between the fans is provided so power transfer may take place in those installations which employ fans. Similar suitable control arrangements are provided in the ducted propeller and tilt-engine type of installations. It is desirable to avoid as many mechanical interconnections as possible between the fans and/or gas generators which require extensive use of hardware and complexities in the control mechanism. The omission of any unnecessary hardware is obviously of great importance and highly desired.

The term aerodynamic is used herein in the specification and claims and it is to be understood that it is merely a descriptive term for the gas coupling as disclosed herein and is obviously not intended to be confined strictly to air or conventional exhaust gases. In other words, it is intended to cover a "pneumatic" type system wherein no gearing and/or mechanical linkages are involved.

The present invention is a cruise lift-fan system for VTOL aircraft employing tip turbine fans in the same general position as are employed on the well known Caravelle-type aircraft. The system herein disclosed is combined with other lifting means and is supplementary to such lifting means and is especially adaptable to aircraft of the general type shown in co-pending U.S. application Serial No. 104,328, filed April 20, 1961, and assigned to the assignee of the instant invention.

The main object of the present invention is to provide a cruise lift-fan system for a VTOL aircraft that employs a unique arrangement of gas generators and fans and aerodynamic interconnections therebetween to use the fans for both lift and cruise.

Another object is to provide such a system which, in itself, provides for roll control to be safe at all times.

A further object is to provide such a system wherein the cruise fans may be efficiently used for lift and may be rotated into the horizontal position for economical and low specific fuel consumption in the cruise position.

Another object is to provide such a system wherein the mechanical cross-over linkages between the fans are kept to a minimum and mixing problems from one or more gas generators are normally avoided to avoid complexities in the controls.

Briefly stated, I provide a cruise lift-fan system for a VTOL aircraft which employs tip turbine fans mounted on each side of the fuselage aft of the center of gravity of the aircraft. The opposite fans are tied together by a tube that is rotatable within the fuselage which tube carries and supports the fans. Thus, no bending loads are applied to the fuselage by the powerplants. Suitable ducting or couplings are provided for normal independent driving of the fans but which may be interconnected in one modification in emergency operation to provide roll control. The use of tip turbine fans permits the gas generator structure to be located within the fuselage resulting in advantages as far as mounting and weight is concerned and results in low specific fuel consumption cruise for economical operation. Suitable means is provided to rotate the fans from the vertical into the horizontal position to change from lift to cruise and the same powerplants are thus used for both attitudes.

While the specification concludes with claims particularly pointing out and distinctly claiming the subject matter which I regard as my invention, it is believed the invention will be better understood from the following description taken in connection with the accompanying drawings in which:

FIGURE 1 is a plan schematic view, partially in cross-section, of the instant invention illustrating the location of the various components in a non-common duct type system;

FIGURE 2 is a view similar to FIGURE 1, illustrating a modification with the cruise fans in the vertical position and showing another non-common duct arrangement; and;

FIGURE 3 is a perspective view, partially in phantom, illustrating the structure interconnecting the cruise fans.

The use of a common duct, into which the gas generators or engines all discharge creates problems in mixing and control. By eliminating the common duct the control problem of the gas generators is simplified. The reason for this is that back pressure on one gas generator in a common duct may affect other gas generators on the same line to change their operation. By avoiding the common duct system it is not necessary to match temperatures, pressures, gas flows, and speed in order to bring them all on the line. Thus, avoidance of the common duct feature where possible permits a simplified control of the gas generators or engines. The normal operation of the instant invention envisages a non-common duct in normal operation in both modifications. However, upon engine failure, provision is made so that both fans will receive power in order to provide for roll control and, in the modification of FIGURE 1, provision is made to then change the non-common duct into a common duct system in emergency.

The general use of fan propulsion and its attendant advantages of low specific fuel consumption (SFC), low pressure ratio, and high by-pass ratio, is well known and by-pass fan engines are in use today. The use of tip turbine fans in the manner proposed in the instant invention, offers additional advantages to those normally obtained by the use of fans as mentioned above, by avoiding having to pass a duct into the center of the fan whereby it is possible to house the gas generators in the fuselage. By allowing the fans to be rotated independent of the gas generators they can be used as a lifting element in the over-all system. Additionally, in the transition phase from vertical to horizontal movement it is possible to program the angle of the fan in order to get high horizontal thrust as well as vertical thrust and gradually transition from hover or vertical flight to horizontal flight. Such arrangement would permit the normal exit louvers for vectoring the thrust in the vertical direction to be omitted.

Referring first to FIGURE 1, there is shown a fuselage 10 generally at the aft end of the aircraft in the vicinity of the tail structure 11. In order to obtain lift and cruise on the aircraft, there is provided, aft of the center of gravity of the aircraft and on each side of the fuselage, a tip turbine fan means generally indicated at 12. These fan means are mounted to operate in the horizontal direction as shown in FIGURE 1 for forward flight or to be rotated by structure to be described into the vertical position as shown in FIGURES 2 and 3 for vertical lift.

A typical fan may be seen in FIGURE 1 and comprises an outer casing 13 housing a scroll 14 which may be of the multiple bubble type in order to obtain the required area without large diameter. Scroll 14 directs the exhaust gases either radially or axially as shown through a diaphragm 15 having suitable sealing means and through turbine buckets 16 mounted on the periphery of fan blades 17 which, in turn, are supported in a bearing 18 in central supporting member or bullet 19 which is supported by struts 20 that may act as outlet guide vanes. Suitable inlet guide vanes (not shown) may also be supplied. Thus, the peripheral arrangement of the scroll around the fan permits the fan to be driven by the turbine buckets resulting in a low pressure ratio, high bypass ratio, low SFC propulsion system. Such a tip turbine fan arrangement also permits the gas generating means to be installed within the fuselage which is preferable for weight considerations and avoids the need for ducting from a centrally mounted gas generator in the usual fan arrangements.

In order that the fans may be rotated relative to the fuselage, a pair of bearings 21 are provided in the fuselage. Disposed for rotation within the bearings and extending transversely through the fuselage, is a connecting tube 22 that is fixedly secured to each fan at 41 by any suitable means such as welding. Thus, rotation of tube 22 rotates fans 12 and it can be seen that the supporting arrangement, by which tube 22 supports the fans, transmits only shear load to the fuselage. The bending moments due to the overhang of the fans from the support bearings is carried by the tube 22 and not transmitted into the fuselage. The location of the bearings on each side of the longitudinal centerline 23 of the fuselage provides for a symmetrical arrangement. Any suitable means such as actuators 24 may be connected to rotate the fans. This may take a variety of forms and the means shown is purely illustrative.

In order to provide a motive fluid or driving force to the fan, suitable gas generating means 25 which may preferably take the form of a pair of gas generators are mounted by any suitable method substantially within the fuselage. Exhaust gas from the gas generators is directed to the scrolls by means of a fixed aerodynamic coupling duct means 26 having branches or connecting ducts 27 connecting the duct 26 and the gas generator 25. It can be seen that this is a common duct in that both ducts 27 discharge into the same coupling duct 26. For bearing simplification and ease of rotation, duct 26 is preferably mounted concentrically in tube 22. Thus, ducting means extends from the gas generators through the tube and towards each fan. The duct 26 may extend any sufficient distance within the tube 22 but will be conveniently terminated at the bearings 21. At this point, suitable rotating seal means 28 is provided. To continue the flow of exhaust gas, extensions 29 connect the rotating seal and scroll 14. Thus, extensions 29 rotate with tube 22 about rotating seal 28 and duct means 26 is stationary within the tube.

In the event of emergency in the single duct system just described with reference to FIGURE 1, it may be necessary to connect the single operating gas generator 25 to the single duct system to drive both fans. For such an emergency, valves 30 are provided in each duct-generator connection 27 and normally assume the solid line position. An additional valve 31 is disposed in the common duct 26 in the normal operating solid line position between each duct-generator connection. When one gas generator fails in an emergency, the valve in its exhaust connection 27 is closed to the dotted line position to isolate it from the rest of the system and prevent back pressure and passage of hot gases into the generator. The remaining gas generator operates with its valve 30 in the solid line position to discharge its exhaust gases into duct 26. Valve 31 is rotated to its dotted line position whereby duct 26 becomes a true common duct since one gas generator now powers both fans to provide roll control. Valves not shown may be provided in the scrolls in order to keep the gas generator area and the tip turbine areas consistent. Thus, the same single duct can be used as independent systems by the use of the valves 30 and 31 as well as a common duct system in the event of gas generator failure.

In order to rotate the fans through the range required for lift and cruise, tube 22 will be supplied with cut out portions 32 as seen in FIGURE 3 whereby the tube may clear the duct-generator connection 27 upon rotation. FIGURE 3 is a cut away view of the system illustrated in FIGURE 1 although substantially the same illustration without the valves suffices for the description of FIGURE 2 to follow. Thus, it can be seen that the fans are rotatable about an axis 33 through the center of duct 26 and the structural construction and orientation results in a weight saving in permitting simple bending in tube 22 on the fuselage rather than transmitting force through other types of connections that would impose bending.

Referring next to FIGURE 2 wherein like numerals apply to like parts, a modification employing a different ducting is used. While the modification illustrated and described in FIGURE 1 may generally be preferable, it may be that control problems can be somewhat simplified by using a different duct arrangement in the same structural combination as previously disclosed. In this figure, the fans 12 as shown in the vertical position as they would appear during the lifting phase. Each gas generator 25 is connected to both fans by means of non-common concentric ducts. A first fixed aerodynamic coupling duct 34 is disposed concentrically within tube 22 and extends through the tube toward each of the fans 12. This duct 34 is an annular duct surrounding an inner concentrically mounted second similar duct 35 connecting the other gas generator ad extending within the tube toward the fans. Thus, three concentric members 22, 34 and 35 are mounted transversely of the fuselage, the fixed ducts 34 and 35 terminating at rotating seal 28. Suitable extension ducts 36 and 37 are connected on the ends of ducts 34 and 35 respectively and connect with the scroll means 38 and 39 about the turbine. Obviously, scrolls 38 and 39 as well as the scroll 14 in FIGURE 1 may be partial admission or complete admission as the fan design dictates. It can be seen that the modification of FIGURE 2 requires no valve inasmuch as a generator out condition permits the fans to be powered by the exhaust gases from the remaining generator through the non-common duct 34 or 35 as the case may be.

Yaw control may be provided by suitable louvers 40 which may be actuated by any suitable means. Louvers are not required to vector the lift because of the rotating feature of the fans as herein described. By preferably disposing the rotating seal 28 concentrically within the bearings 21 it can be seen that the bearing problem is greatly simplified and rotation in the bearing plane reduces the structure required. While preferable, it obviously is not necessary that the rotating seal be located in the plane of the bearing 21. It will also be apparent that more than two gas generators may be used involving the same principle of construction disclosed although the plumbing may become a little more complicated and generally two gas generators will be preferred. Similarly, a single gas generator may be used but such an installation would not provide for adequate emergency operation.

While I have hereinbefore described a preferred form of my invention, obviously many modifications and variations of the present invention are possible in the light of the above teachings. It is therefore to be understood that within the scope of the appended claims, the invention may be practiced otherwise than as specifically described.

I claim:

1. A cruise lift-fan system for a VTOL aircraft comprising, a fuselage, tip turbine fan means mounted on each side of the fuselage aft of the center of gravity of the aircraft, bearings in said fuselage, a tube extending transversely through said fuselage in said bearings connecting said opposite fans together and supporting them on the fuselage, gas generator means within said fuselage, fixed aerodynamic coupling duct means connected to said gas generator means and extending through said tube toward said fan means, a rotatable extension on the ends of said coupling means connecting said coupling means and said fans, and means to rotate said fans on said tube relative to said fuselage.

2. A cruise lift-fan system for a VTOL aircraft comprising, a fuselage, tip turbine fan means mounted on each side of the fuselage aft of the center of gravity of the aircraft, bearings on each side of said fuselage, a tube extending transversely through said fuselage in said bearings and fixedly connected at each end to a fan means to connect the opposite fan means together and support them on the fuselage, gas generator means within said fuselage, fixed aerodynamic coupling duct means connected to said gas generator means and disposed concentrically within said tube, said coupling means extending through said tube toward said fan means, a rotatable extension on the ends of said coupling means connecting said coupling means and said fans, and means to rotate said fans on said tube relative to said fuselage.

3. A cruise lift-fan system for a VTOL aircraft comprising, a fuselage, a tip turbine fan mounted on each side of the fuselage aft of the center of gravity of the aircraft, each fan having a scroll about its periphery to direct exhaust gases to drive the turbine, a pair of bearings, one on each side of the longitudinal centerline of the fuselage and supported in the fuselage, a tube supported for rotation in said bearings transversely of the fuselage and fixedly connecting the opposite tip turbine fans together and supporting them on the fuselage, gas generator means within said fuselage, fixed aerodynamic coupling duct means connected to said gas generator means and disposed concentrically within said tube, said coupling means extending through said tube toward said fans, a rotatable extension on the ends of said coupling means connecting said coupling means and said scrolls, and means to rotate said fans on said tube relative to said fuselage.

4. Apparatus as described in claim 3 wherein a plurality of gas generator means is provided connected to said coupling means and a valve is provided in the connection between each gas generator means and said coupling.

5. Apparatus as described in claim 3 wherein two gas generator means are provided connected to said coupling means, a valve in the connection between each gas generator means and said coupling, and a valve in said coupling between the inlets from each gas generator.

6. A cruise lift-fan system for a VTOL aircraft comprising, a fuselage, a tip turbine fan mounted on each side of the fuselage aft of the center of gravity of the aircraft, each fan having a scroll about its periphery to direct exhaust gases to drive the turbine, a pair of bearings, one on each side of the longitudinal centerline of the fuselage and supported in the fuselage, a tube supported for rotation in said bearings transversely of the fuselage and fixedly connecting the opposite tip turbine fans together and supporting them on the fuselage, a pair of gas generators within said fuselage, a fixed aerodynamic common duct coupling means connected to each gas generator and disposed concentrically within said tube, said common duct means extending through said tube toward said fans, said tube having cut out means spanning duct-generator connections, an extension duct fixedly connected to each scroll and rotatably connected to said common duct at the ends thereof, and means to rotate said fans on said tube relative to said fuselage.

7. Apparatus as described in claim 6 wherein a valve is disposed in each duct-generator connection and another valve is disposed in the common duct between each duct generator connection.

8. A cruise lift-fan system for a VTOL aircraft comprising, a fuselage, a tip turbine fan mounted on each side of the fuselage aft of the center of gravity of the aircraft, each fan having a scroll about its periphery to direct exhaust gases to drive the turbine, a pair of bearings, one on each side of the longitudinal centerline of the fuselage and supported in the fuselage, a tube supported for rotation in said bearings transversely of the fuselage and fixedly connecting the opposite tip turbine fans together and supporting them on the fuselage, a pair of gas generators within said fuselage, a first fixed aerodynamic coupling duct means connected to one gas generator and disposed concentrically within said tube, said first duct means extending through said tube toward said fans, a second fixed aerodynamic coupling duct means connected to the other gas generator and disposed concentrically within said first duct means and extending through said tube toward said fans, said tube having cut out means spanning duct-generator connections, extension duct means fixedly connected to each scroll and rotatably connected to said first and second duct means at the ends thereof, and means to rotate said fans on said tube relative to said fuselage.

9. Apparatus as described in claim 8 wherein extension duct means rotatable connection to said first and second duct means is concentrically disposed within said bearings in the plane of rotation thereof.

References Cited in the file of this patent

UNITED STATES PATENTS

| 2,863,620 | Vautier | Dec. 9, 1958 |
| 2,961,189 | Doak | Nov. 22, 1960 |

FOREIGN PATENTS

| 1,053,321 | Germany | Mar. 19, 1959 |
| 862,032 | Great Britain | Mar. 1, 1961 |